United States Patent
Kin et al.

(10) Patent No.: US 6,223,116 B1
(45) Date of Patent: Apr. 24, 2001

(54) WHEEL SLIP ANGLE DETECTING SYSTEM FOR VEHICLE

(75) Inventors: Keiyu Kin; Hiroyuki Urabe, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,249

(22) Filed: Jul. 8, 1999

(30) Foreign Application Priority Data

Jul. 10, 1998 (JP) .................................................. 10-196282

(51) Int. Cl.$^7$ .............................. G06F 7/00; G06F 17/00
(52) U.S. Cl. .................................. 701/82; 701/69; 701/71; 701/73; 701/74; 701/90; 303/140; 303/146; 180/197
(58) Field of Search .................................. 701/69, 70, 71, 701/72, 73, 74, 75, 82, 90; 303/140, 146, 163, 165; 180/197

(56) References Cited

U.S. PATENT DOCUMENTS

| | | | |
|---|---|---|---|
| 4,679,808 | * | 7/1987 | Ito et al. ............................... 180/408 |
| 5,627,754 | * | 5/1997 | Asanuma et al. ....................... 701/41 |
| 5,899,952 | * | 5/1999 | Fukada ................................... 701/74 |

* cited by examiner

Primary Examiner—William A. Cuchlinski, Jr.
Assistant Examiner—Gertrude Arthur
(74) Attorney, Agent, or Firm—Armstrong, Westerman, Hattori, McLeland & Naughton, LLP (57) ABSTRACT

A travel state of a vehicle is detected by a travel-state detecting device. A lateral slip angle of a vehicle body is calculated as a first lateral slip angle in a first lateral slip angle calculating device by integrating a differentiated value of lateral slip angle determined based on a non-linear four-wheel vehicle's motion model. A lateral slip angle of the vehicle body is calculated as a second lateral slip angle in a second lateral slip angle calculating device by a calculation in a linear two-wheel vehicle's motion model. One of the first and second lateral slip angles is selected alternatively in a selecting device in accordance with the travel state detected by the travel-state detecting device such that the second lateral slip angle is selected when the travel-state detecting device detects a state in which the vehicle is traveling straightforwardly at a low speed. A slip angle of each of wheels is calculated by a slip angle calculating device based on the lateral slip angle selected in the selecting device. Thus, the lateral slip angle of the vehicle body can be calculated with good accuracy using an appropriate calculating equation depending on the travel state of the vehicle, and the wheel slip angle can be determined with good accuracy using the lateral slip angle of high accuracy.

2 Claims, 7 Drawing Sheets

WHEEL SLIP ANGLE DETECTING SYSTEM FOR VEHICLE

BACKGROUND OF THE INVENTION

1. Field of the Invention

The present invention relates to a wheel slip angle detecting system for a vehicle, designed to determine a slip angle of each of wheels (an angle formed by the direction of movement of the wheel with respect to the orientation of the wheel) to grasp a road surface contact situation of each wheel, and more specifically, a lateral force itself of each wheel, in order to increase the accuracy in the control of the motion, e.g., of the turning movement of the vehicle.

2. Description of the Related Art

For example, there is conventionally known a technique of detecting a slip angle of each of wheels in the control of the motion of a vehicle (e.g., in the traction control, the antilock brake control and the like), such as the one disclosed in Japanese Patent Application Laid-Open No. 9-142280.

In Japanese Patent Application Laid-Open No. 9-142280, to determine the slip angle of the wheel, a lateral slip angle of a vehicle body (an angle formed by the direction of movement of the vehicle with respect to the orientation of the vehicle) must be calculated. It is a conventional practice to calculate a lateral slip angle $\beta$ of a vehicle body by integrating a differentiated value of lateral slip angle determined according to a differential equation based on a linear two-wheel vehicle's motion model. More specifically, a differentiated value $d\beta/dt$ of lateral slip angle $\beta$ is calculated according to the differential equation $\{d\beta/dt=(AY/V)-\gamma\}$, and a lateral slip angle $\beta$ is determined by integrating the differentiated value $d\beta/dt$, wherein AY represents a lateral acceleration of a vehicle body; $\gamma$ represents a yaw rate; and V represents a vehicle speed.

However, when the vehicle is in a state traveling straightforwardly at a low speed, detected values of the lateral acceleration AY, yaw rate $\gamma$ and vehicle speed V are small. In a system designed so that a lateral slip angle $\beta$ is determined by integrating such detected values, a sensor noise (a mounting error noise) of detector means for detecting a lateral acceleration AY, a yaw rate $\gamma$ and a vehicle speed V and a travel noise are accumulated in the course of integral calculation, resulting in poor lateral slip angle calculation accuracy and in reduced wheel slip angle detecting accuracy.

SUMMARY OF THE INVENTION

Accordingly, it is an object of the present invention to provide a wheel slip angle detecting system for a vehicle, wherein a lateral slip angle of a vehicle body is calculated with good accuracy using an appropriate calculating equation suitable for a travel state of the vehicle, and a wheel slip angle is determined with good accuracy using the lateral slip angle having high accuracy.

To achieve the above object, according to a first aspect and feature of the present invention, there is provided a wheel slip angle detecting system for a vehicle, comprising a vehicle speed detecting means for detecting a vehicle speed; a yaw rate detecting means for detecting a yaw rate, a lateral acceleration detecting means for detecting a lateral acceleration; a steering angle detecting means for detecting a steering angle; a slip rate calculating means for calculating a slip rate of each of wheels; a tire characteristic establishing means in which tire characteristics are previously determined based on actual travel data; a travel-state detecting means for detecting a travel state of the vehicle based on the vehicle speed, the yaw rate, the lateral acceleration and the steering angle which are detected by the detecting means, respectively; a lateral acceleration presuming means for determining a presumed lateral acceleration of a vehicle body; a first lateral slip angle calculating means for calculating a lateral slip angle of the vehicle body as a first lateral slip angle by integrating a differentiated value of lateral slip angle determined based on a non-linear four-wheel vehicle's motion model using the vehicle speed detected by the vehicle speed detecting means, the yaw rate detected by the yaw rate detecting means and the presumed lateral acceleration determined by the lateral acceleration presuming means; a second lateral slip angle calculating means for calculating a lateral slip angle of the vehicle body as a second lateral slip angle based on a linear two-wheel vehicle's motion model using the vehicle speed, the yaw rate, the lateral acceleration and the steering angle detected by the detecting means, respectively; a selecting means operable to select the second lateral slip angle calculated in the second lateral slip angle calculating means upon the detection by the travel-state detecting means of a state in which the vehicle is traveling straightforwardly at a low speed, and to select the first lateral slip angle calculated in the first lateral slip angle calculating means in other states; and a slip angle calculating means for calculating a slip angle of each wheel based on the lateral slip angle selected in the selecting means, wherein the lateral acceleration presuming means being operable to presume a presumed lateral acceleration of the vehicle body based on at least one of the slip angle calculated in the slip angle calculating means and the slip rate calculated in the slip rate calculating means, and based on the tire characteristics established in the tire characteristic establishing means.

As used herein, the term "linear two-wheel vehicle's motion model" means a motion model in which cornering forces for the front and rear wheels are varied linearly with respect to the slip angle on the assumption that the cornering forces for the left and right front wheels are equal to each other and the cornering forces for the left and right rear wheels are equal to each other. The term "non-linear four-wheel vehicle's motion model" means a motion model in which cornering forces for the front and rear wheels are varied non-linearly with respect to the slip angle in a state in which it is not on the assumption that the cornering forces for the left and right front wheels and for the left and right rear wheels are equal to each other.

With the arrangement of such first feature, when it is detected by the travel-state detecting means that the vehicle is in a state traveling straightforwardly at a low speed, the slip angle of each wheel is calculated based on the second lateral slip angle calculated in the second lateral slip angle calculating means. However, the second lateral slip angle is calculated using detected values of the vehicle speed, yaw rate, lateral acceleration and steering angle and is not calculated by integration. Therefore, even if the detected values of the vehicle speed, yaw rate, lateral acceleration and steering angle are small due to a low-speed traveling state near a state traveling straightforwardly, a sensor noise (a mounting error noise) and a travel noise cannot be accumulated and hence, the lateral slip angle can be calculated with good accuracy. On the other hand, except for the case where the vehicle is in the state traveling straightforwardly at a low speed, the slip angle of each wheel is calculated based on the first lateral slip angle calculated in the first lateral slip angle calculating means. However, among the vehicle speed, the yaw rate and the lateral acceleration used to calculate the first lateral slip angle, the detected values of the vehicle speed and the yaw rate are relatively large, and the proportion of the noise magnitude with respect to the detected values is relatively small. Moreover, the lateral acceleration is presumed using the tire characteristics previously established from actual travelings and at least one of the slip angle calculated in the slip angle calculating means and the slip rate calculated in the slip rate calculating means so that the presuming accuracy can be increased. Even if the first lateral slip angle is determined by integrating a differentiated value of the lateral slip angle, the error accumulation due to the noise in the course of integral calculation can be maintained to a small level, thereby increasing the lateral slip angle calculating accuracy. Therefore, the wheel slip angle can be determined with good accuracy based on the lateral slip angle of high accuracy, irrespective of the traveling state of the vehicle.

According to a second aspect and feature of the present invention, in addition to the first feature, the wheel slip angle detecting system further comprises a first deviation calculating means for calculating a deviation between the presumed lateral acceleration determined in the lateral acceleration presuming means and the lateral acceleration detected by the lateral acceleration detecting means based on the tire characteristics established in the tire characteristic establishing means, a vehicle body yaw moment presuming means for presuming a yaw rate variation speed as a vehicle body yaw moment based on the tire characteristics established in the tire characteristic establishing means, a differentiating means for differentiating the yaw rate detected by the yaw rate detecting means, a second deviation calculating means for calculating a deviation between the presumed yaw rate variation speed determined in the vehicle body yaw moment presuming means and a detected yaw rate variation speed determined in the differentiating means, a high-select means for selecting a larger one of the deviations calculated respectively in the first and second deviation calculating means, and a friction coefficient presuming means for presuming a road surface friction coefficient based on the deviation selected in the high-select means, and wherein the tire characteristic establishing means is operable to correct the tire characteristics in accordance with the presumed friction coefficient determined in the friction coefficient presuming means.

With the arrangement of such second feature, it is possible to determine the wheel slip angle depending on an actual road surface friction coefficient. More specifically, the presumed lateral acceleration and the presumed yaw rate variation speed a re based on the tire characteristics established in the tire characteristic establishing means with the road surface friction coefficient being defined constant. Therefore, when the actual road surface friction coefficient is changed from a value at the time of presumption of the lateral acceleration and the yaw rate variation speed, a deviation corresponding to the variation in friction coefficient must be produced between the lateral acceleration detected by the lateral acceleration detecting means and the presumed lateral acceleration, and a deviation corresponding to the variation in friction coefficient must be produced between the value determined by differentiating the yaw rate detected by the yaw rate detecting means and the presumed yaw rate variation speed. The two deviations, i.e., the presumed deviation between the lateral accelerations and the yaw rate variation rate appear significantly when the road surface friction coefficient is relatively large and when the road surface friction coefficient is relatively small, respectively. Therefore, it is determined that a larger one of the value calculated in the first deviation calculating means for calculating the deviation between the detected lateral acceleration and the presumed lateral acceleration and the value calculated in the second deviation calculating means for calculating the deviation between the detected yaw rate and the presumed yaw rate, i.e., a value largely influenced by the variation in friction coefficient is a deviation corresponding to an amount of variation in friction coefficient, and the friction coefficient is corrected, while the presumed lateral acceleration and the presumed yaw rate variation speed are corrected. Thus, it is possible to determine a presumed lateral acceleration and a presumed yaw rate variation speed corresponding to an actual road surface friction coefficient. Therefore, the tire characteristics can be corrected in accordance with the actual road surface friction coefficient, and further, a corrected precise wheel slip angle can be determined.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment with reference to FIGS. 1 to 7.

Figure 1:
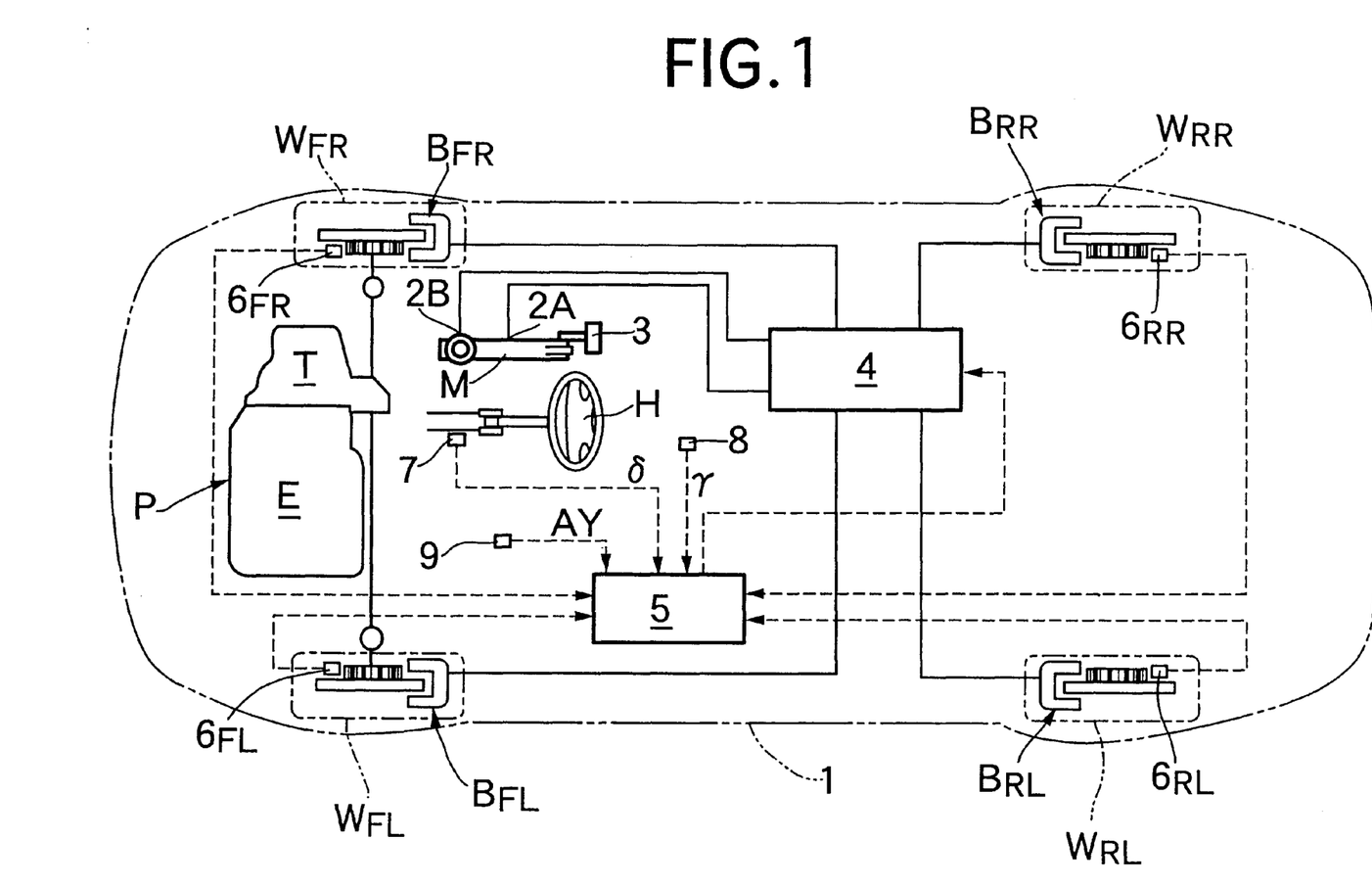
FIG. 1 is an illustration showing a driving system and a braking system in a vehicle.

Referring first to FIG. 1, a power unit P comprising an engine E and a transmission T is mounted at a front portion of a vehicle body 1 to drive a left front wheel $W_{FL}$ and a right front wheel $W_{FR}$ which are driven wheels. Left and right front wheel brakes $B_{FL}$ and $B_{FR}$ are mounted on the left and right front wheels $W_{FL}$ and $W_{FR}$, and left and right rear wheel brakes $B_{RL}$ and $B_{RR}$ are mounted on a left rear wheel $W_{RL}$ and a right rear wheel $W_{RR}$ which are follower wheels. Each of the wheel brakes $B_{FL}$, $B_{FR}$, $B_{RL}$ and $B_{RR}$ is a disk brake, for example.

A braking liquid pressure depending on the operation of depression of a brake pedal 3 is delivered from first and second output ports 2A and 2B provided in a tandem-type master cylinder M. Both of the output ports 2A and 2B are connected to a braking liquid pressure circuit 4, so that a braking liquid pressure from the braking liquid pressure circuit 4 is applied to each of the wheel brakes $B_{FL}$, $B_{FR}$, $B_{RL}$ and $B_{RR}$. In the braking liquid pressure circuit 4, the braking liquid pressure applied to each of the wheel brakes $B_{FL}$, $B_{FR}$, $B_{RL}$ and $B_{RR}$ is regulated by control by a control unit 5. Input to the control unit 5 are detection values provided by wheel speed detectors $6_{FL}$, $6_{FR}$, $6_{RL}$ and $6_{RR}$ for detecting wheel speed of the wheels $W_{FL}$, $W_{FR}$, $W_{RL}$ and $W_{RR}$, a steering angle detecting means 7 for detecting a steering angle δ provided by operation of a steering wheel H, a yaw rate detecting means 8 for detecting a yaw rate γ of a vehicle, and a lateral acceleration detecting means 9 for detecting a lateral acceleration AY of the vehicle.

Figure 2:
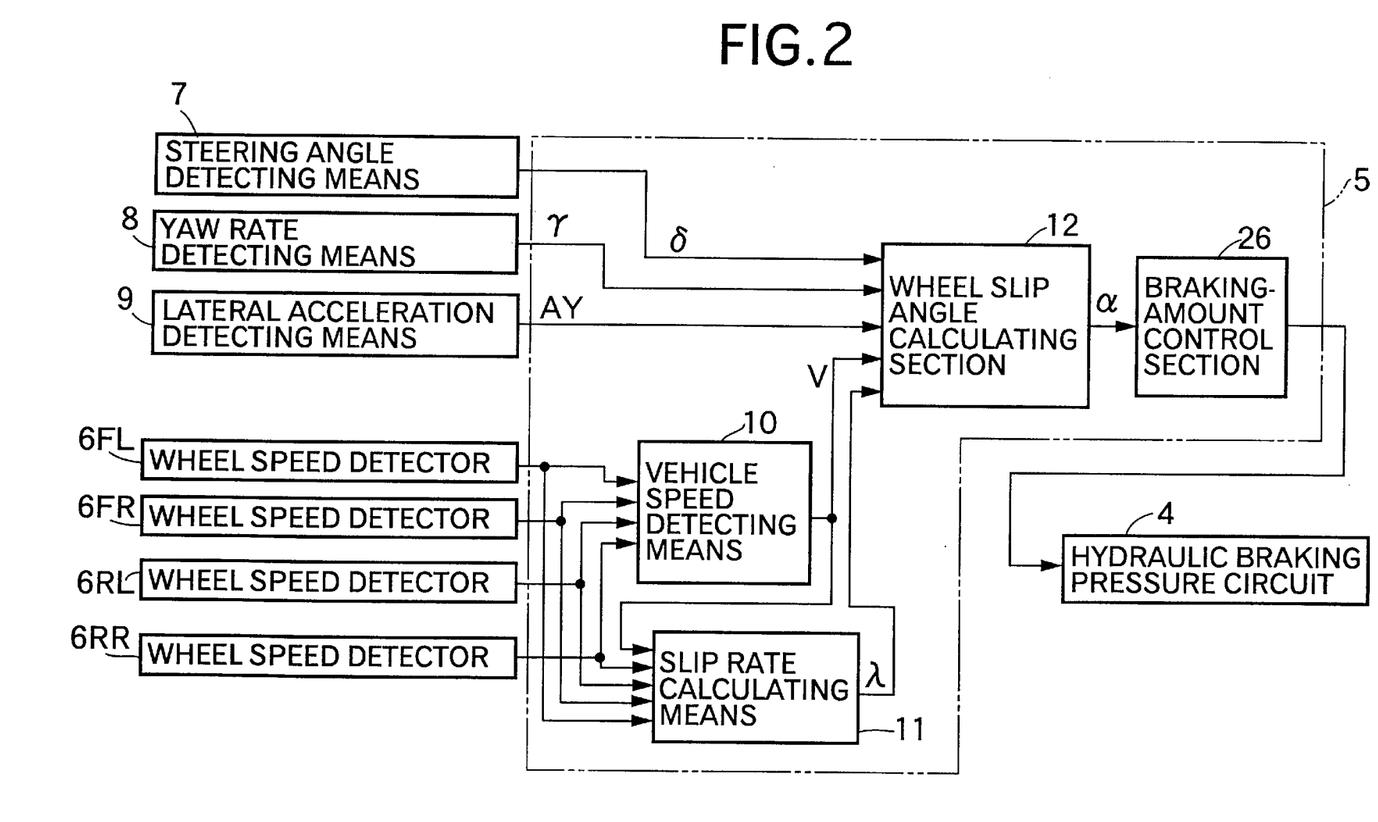
FIG. 2 is a block diagram showing the arrangement of a control unit.

Referring to FIG. 2, the control unit 5 includes a vehicle speed detecting means 10, a slip rate calculating means 11, a wheel slip angle calculating section 12, and a braking amount control section 26.

In the vehicle speed detecting means 10, a vehicle speed V is provided based on the detection values provided by the four wheel speed detectors $6_{FL}$, $6_{FR}$, $6_{RL}$ and $6_{RR}$ for individually detecting wheel speed of the wheels $W_{FL}$, $W_{FR}$, $W_{RL}$ and $W_{RR}$. In the slip rate calculating means 11, a slip rate for every wheel is calculated based on the vehicle speed V calculated by the vehicle speed detecting means 10 and the detection values provided by the wheel speed detectors $6_{FL}$, $6_{FR}$, $6_{RL}$ and $6_{RR}$.

The wheel slip angle calculating section 12 calculates a slip angle of each of the wheels to grasp a grip force of each of tires on the four front and rear wheels in order to increase the control accuracy in the control of the turning movement of the vehicle. A slip angle α for every wheel is calculated in the wheel slip angle calculating section 12, based on the steering angle δ detected by the steering angle detecting means 7, the yaw rate γ detected by the yaw rate detecting means 8, the lateral acceleration AY detected by the lateral acceleration detecting means 9, the vehicle speed V detected by the vehicle speed detecting means 10, and the slip rate for every wheel calculated by the slip rate calculating means 11. The wheel slip angle a provided by the wheel slip angle calculating section 12 is input to the braking amount control section 26. The braking liquid pressure applied to each of the wheel brakes $B_{FL}$, $B_{FR}$, $B_{RL}$ and $B_{RR}$ to control the turning movement of the vehicle on the basis of the wheel slip angle is calculated in the braking amount control section 26. The braking liquid pressure circuit 4 is operated on the basis of the result of the calculation in the braking amount control section 26.

Figure 3:
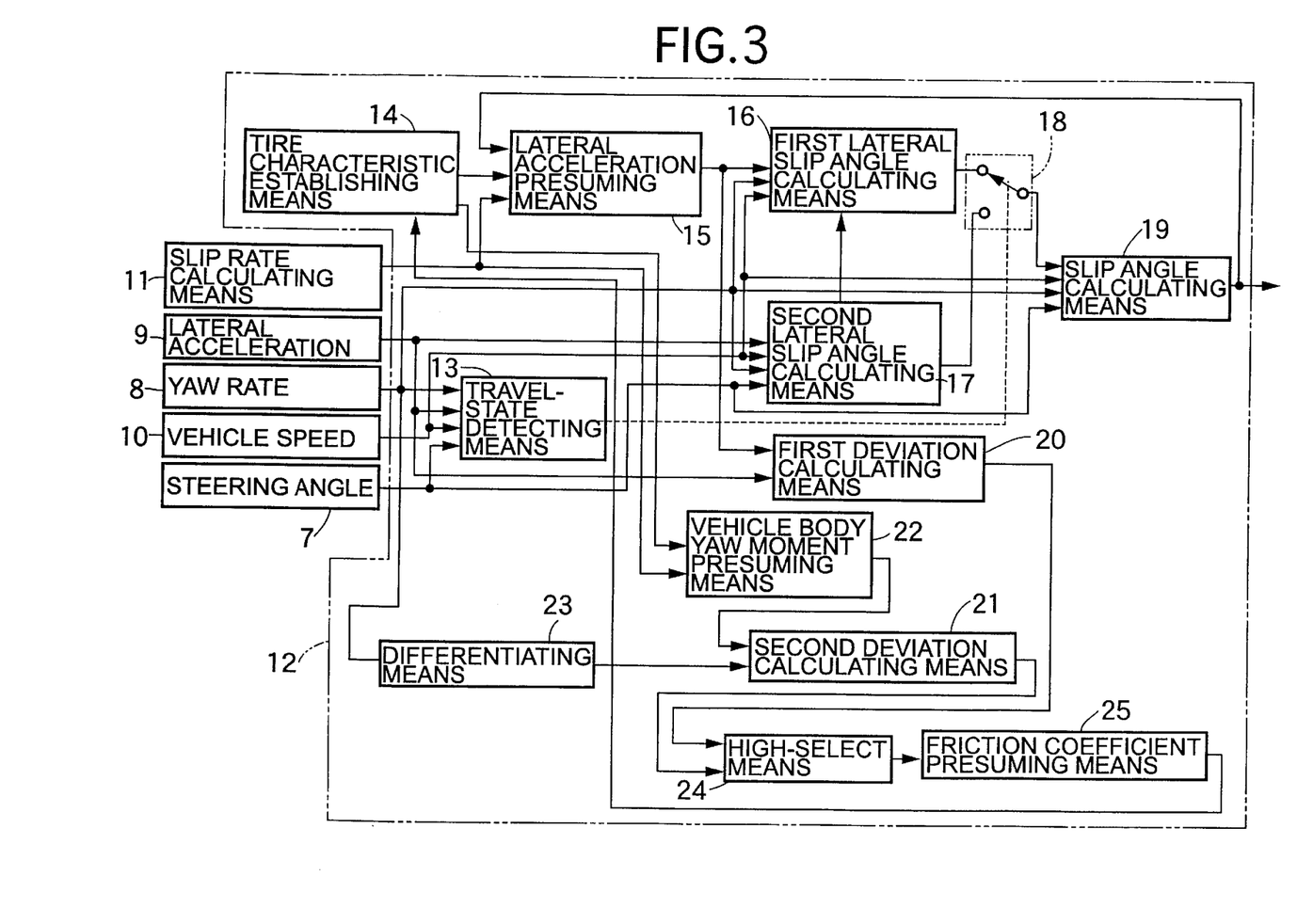
FIG. 3 is a block diagram showing the arrangement of a wheel slip angle detecting system in the control unit.

Referring to FIG. 3, the wheel slip angle calculating section 12 includes a travel-state detecting means 13, a tire characteristic establishing means 14, a lateral acceleration presuming means 15, a first lateral slip angle calculating means 16, a second lateral slip angle calculating means 17, a selecting means 18, a slip angle calculating means 19, a first deviation calculating means 20, a second deviation calculating means 21, a vehicle body yaw moment presuming means 22, a differentiating means 23, a high-select means 24, and a friction coefficient presuming means 25.

Figure 4:
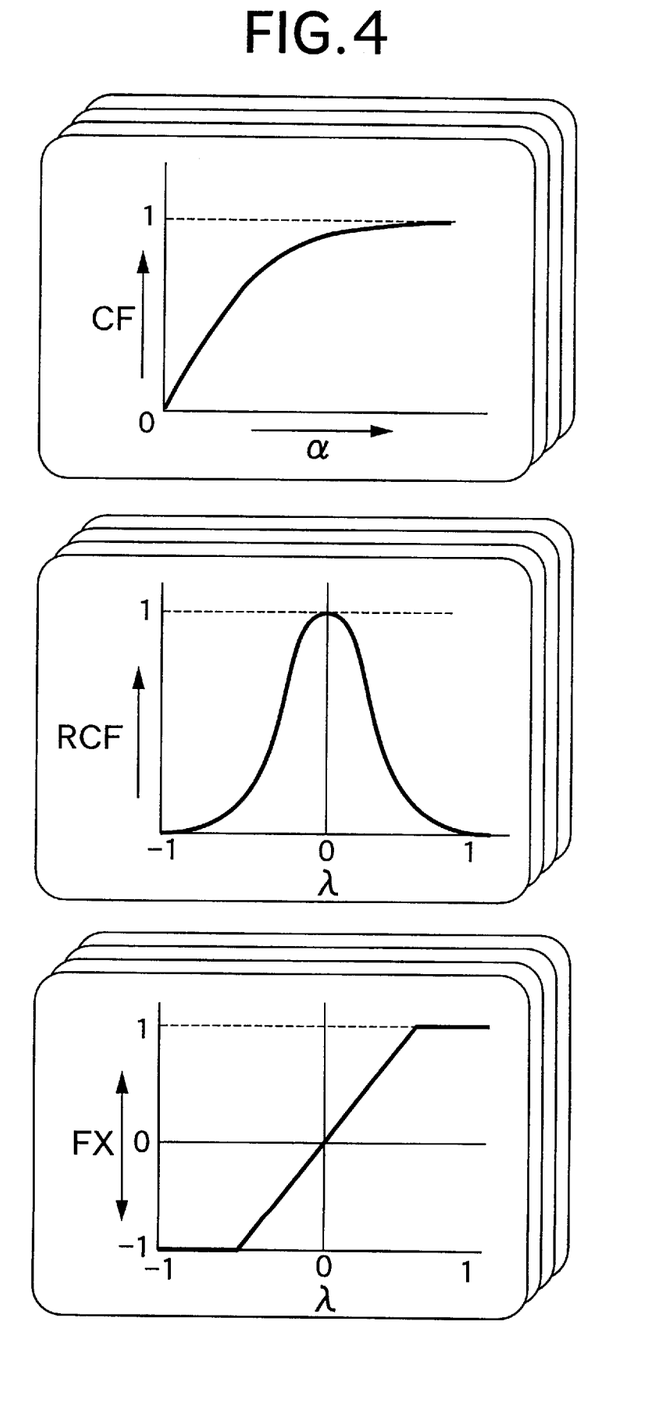
FIG. 4 is a diagram showing tire characteristics established in a tire characteristic establishing means.

Tire characteristics for every tire on the wheels are previously established in the tire characteristic determining means 14 based on actual travel data. Specifically, a slip angle/cornering force characteristic showing the relationship between the slip angle α and the cornering force CF, a slip angle/cornering force decrease rate characteristic showing the relationship between the slip rate λ and the cornering force decrease rate RCF and a slip rate/braking and driving force characteristic showing the relationship between the slip rate λ and the braking and driving forces FX, are previously established in the tire characteristic establishing means 14 for every wheel in accordance with the friction coefficient μ of a road surface presumed by the friction coefficient presuming means 25, as shown in FIG. 4. In other words, the tire characteristic establishing means 14 has a function to correct the slip angle/cornering force characteristic, the slip angle/cornering force decrease rate characteristic and the slip rate/braking and driving force characteristic in accordance with the presumed friction coefficient μ provided by the friction coefficient presuming means 25.

A presumed lateral acceleration AYE is presumed by the lateral acceleration presuming means 15, based on the slip angle/cornering force characteristic and the slip rate/cornering force decrease rate characteristic of the tire characteristics established in the tire characteristic establishing means 14. More specifically, the tire characteristic establishing means 14 is connected to the lateral acceleration presuming means 15, and the slip rate λ calculated in the slip rate calculating means 11 and the slip angle α for every wheel calculated in the slip angle calculating means 19 are input to the lateral acceleration presuming means 15, so that the presumed lateral acceleration AYE is determined in the lateral acceleration presuming means 15, based on a total sum of values (CF×RCF) for the four left and right front and rear wheels.

The cornering force CF is corrected in accordance with a variation in the slip rate λ with the control of the vehicle's motion by multiplying the cornering force CF by the cornering force decrease rate RCF based on the slip rate/cornering force decrease rate characteristic in the above calculation (CF×RCF).

The presumed lateral acceleration AYE determined by the lateral acceleration presuming means 15 is input to the first lateral slip angle calculating means 16. The vehicle speed V detected by the vehicle speed detecting means 10 and the yaw rate γ detected by the yaw rate detecting means 8, in addition to the presumed lateral acceleration AYE, are input to the first lateral slip angle calculating means 16, and the calculation for determining the lateral slip angle of the vehicle body as a first lateral slip angle β1 based on a non-linear four-wheel vehicle's motion model is carried out in the first lateral slip angle calculating means 16.

According to a differential equation based on the non-linear four-wheel vehicle's motion model, a differentiation value of a lateral slip angle is provided as {(lateral acceleration/vehicle speed)−yaw rate}. If the lateral acceleration is the presumed lateral acceleration AYE; the vehicle speed is the vehicle speed V detected by the vehicle speed detecting means 10; and the yaw rate is the yaw rate γ detected by the yaw rate detecting means 8, a differentiation value (dβ1/dt) of the first lateral slip angle β1 is calculated according to the following equation:

$$dβ1/dt=(AYE/V)−γ \qquad (1)$$

In addition, the first lateral slip angle β1 is calculated in the first lateral slip angle calculating means 16 by integrating the differentiation value (dβ1/dt) according to the following equation:

$$β1=∫\{(AYE/V)−γ\}dt+β1_0 \qquad (2)$$

wherein $β1_0$ is an initial value for the first lateral slip angle β1. The initial value $β1_0$ is input from the second lateral slip angle calculating means 17.

The first lateral slip angle β1 determined based on the non-linear four-wheel vehicle's motion model is equal to a lateral slip angle at the time when the lateral slip amount is relatively large in the turning movement state of the vehicle. However, when the lateral slip amount is relatively small in a state in which the vehicle is traveling straightforwardly at a low speed, there is a relatively large error due to accumulation of noise in the course of integral calculation of the first lateral slip angle $\beta1$, and it is not appropriate that a wheel slip angle $\alpha$ is determined using the first lateral slip angle $\beta1$ in the state in which the vehicle is traveling straightforwardly at the low speed. Therefore, the calculation for determining the lateral slip angle of the vehicle body as a second lateral slip angle $\beta2$ based on a linear two-wheel vehicle's motion model is carried out in the second lateral slip angle calculating means 17.

Figure 5:
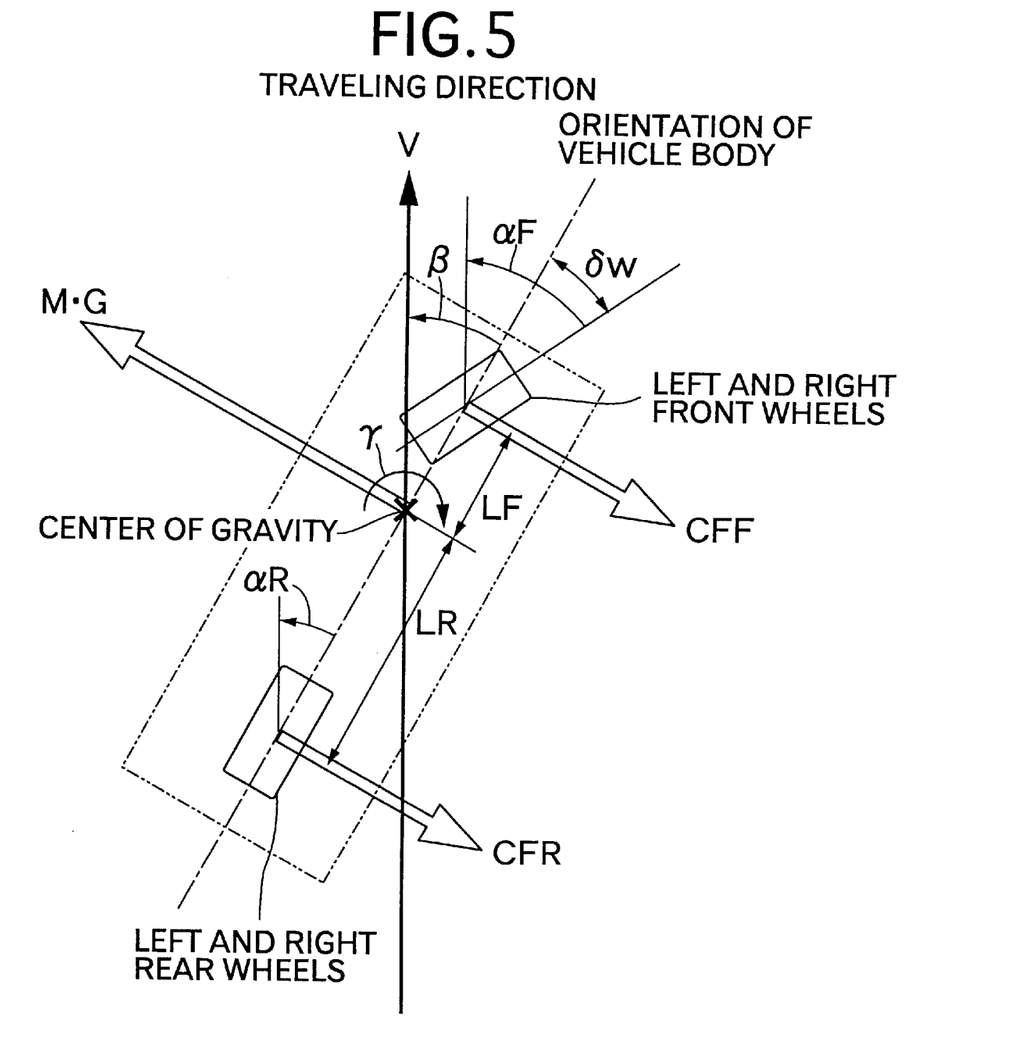
FIG. 5 is a diagram showing the balance of lateral forces in a linear two-wheel vehicle's motion model.

In the linear two-wheel vehicle's motion model, a lateral dynamic equation is used wherein the cornering forces CFF for the left and right front wheels are equal to each other, and the cornering forces CFR for the left and right rear wheels are each to each other, as shown in FIG. 5. In FIG. 5, the slip angle $\alpha F$ of the front wheels and the slip angle $\alpha R$ of the rear wheels and the lateral slip angle $\beta$ of the vehicle body are represented with the counterclockwise direction being defined as positive. When the mass of the vehicle is represented by M; the cornering force for the front wheels is represented by CFF; and the cornering force for the rear wheels is represented by CFR, the following equation is established:

$$M \cdot AY = CFF + CFR \tag{3}$$

Figure 6:
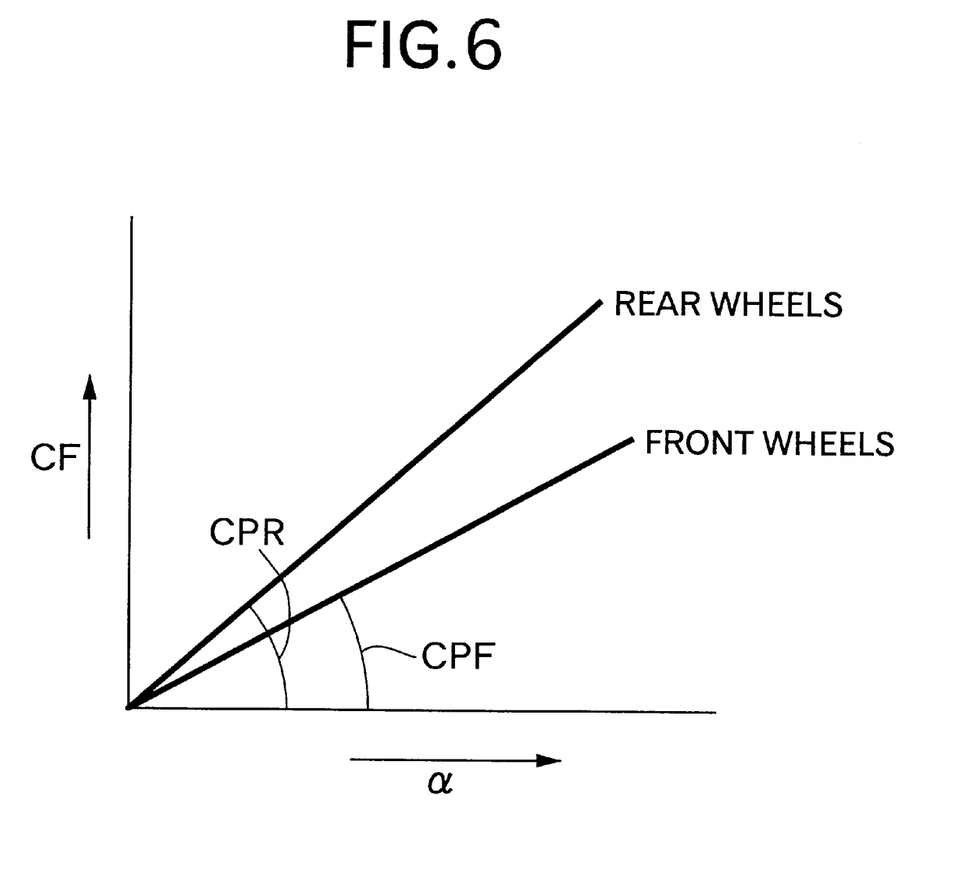
FIG. 6 is a diagram showing tire characteristics used in the linear two-wheel vehicle's motion model.

The cornering force CF is linear as shown in FIG. 6, when the wheel slip angle $\alpha$ is in a small range. Therefore, when the cornering power for the front wheels is represented by CPF; the cornering power for the rear wheels is represented by CPR; the slip angle of the front wheels is represented by $\alpha F$; and the slip angle of the rear wheels is represented by $\alpha R$, the following equations are established:

$$CFF = CPF \times \alpha F \tag{4}$$

$$CFR = CPR \times \alpha R \tag{5}$$

The slip angle $\alpha F$ of the front wheels and the slip angle $\alpha R$ of the rear wheels can be represented as follows, using the distance LF from the center of gravity of the vehicle body to the front wheels, the distance LR from the center of gravity of the vehicle body to the rear wheels, the vehicle speed V, the lateral slip angle $\beta$ of the vehicle body, the yaw rate $\gamma$ and the actual steering angle $\delta w$ of the front wheels:

$$\alpha F = \beta + (LF/V) \times \gamma - \delta w \tag{6}$$

$$\alpha R = \beta - (LR/V) \times \gamma \tag{7}$$

wherein the actual steering angle $\delta w$ of the front wheels is determined by dividing the steering angle $\delta$ detected by the steering angle detecting means 7 by a gear ratio in a steering system, and performing the correction taking Ackerman angle into consideration.

If the above equations (4) to (7) are substituted into the equation (3), the following equation is established:

$$M \times AY = CPF \times \{\beta + (LF/V) \times \gamma - \delta w\} + \tag{8}$$
$$CPR \times \{\beta - (LR/V) \times \gamma\}$$

If this equation (8) is rearranged for $\beta$, the following equation can be provided:

$$\beta = [M/(CPF + CPR)] \times AY - \{(CPF \times LF - CPR \times LR)/ \tag{9}$$
$$(CPF + CPR)\} \times \gamma/V + \{CPF/(CPF + CPR)\} \times \delta w$$

Each of CPF, CPR, LF, LR and M is a constant value peculiar to the vehicle and hence, the equation (9) can be rewritten as follows:

$$\beta = C1 \times AY - C2 \times \gamma/V + C3 \times \delta w \tag{10}$$

The second lateral slip angle calculating means 17 carries out the calculation according to the above equation (10). The vehicle speed V detected by the vehicle speed detecting means 10, the yaw rate $\gamma$ detected by the yaw rate detecting means 8, and the lateral acceleration AY detected by the lateral acceleration detecting means 9 and the steering angle $\delta$ detected by the steering angle detecting means 7 are input to the second lateral slip angle calculating means 17. The second lateral slip angle calculating means 17 outputs the slip angle $\beta$ determined by the calculation according to the equation (10) as the second lateral slip angle $\beta2$.

The first lateral slip angle $\beta1$ calculated by the first lateral slip angle calculating means 16 and the second lateral slip angle $\beta$ calculated by the second lateral slip angle calculating means 17 are alternatively selected by the selecting means 18 and input to the slip angle calculating means 19. The alternative selection by the selecting means 18 is switched over by the travel-state detecting means 13.

The travel-state detecting means 13 detects the travel state of the vehicle, based on the vehicle speed V detected by the vehicle speed detecting means 10, the yaw rate $\gamma$ detected by the yaw rate detecting means 8, the lateral acceleration AY detected by the lateral acceleration detecting means 9 and the steering angle $\delta$ detected by the steering angle detecting means 7. The travel-state detecting means 13 determines whether, for example, all of the following conditions are realized:

V<10 km/hr

−3 (deg)<$\delta$<+3 (deg)

−0.1 (G)<AY<+0.1 (G)

−1.0 (deg/s)<$\gamma$<+1.0 (deg/s)

When all of the above conditions are realized, the travel-state detecting means 13 determines that the vehicle is in a state in which it is traveling straightforwardly at a low speed, and a signal indicative of command to select the second lateral slip angle $\beta2$ calculated in the second lateral slip angle calculating means 17 by the selecting means 18 is applied to the selecting means 18. When even one of the conditions is not realized, however, a signal indicative of command to select the first lateral slip angle $\beta1$ calculated in the first lateral slip angle calculating means 16 by the selecting means 18 is applied to the selecting means 18.

In the slip angle calculating means 19, the calculation of the slip angle $\alpha$ for every wheel according to the equations (6) and (7) is carried out using the first lateral slip angle $\beta1$ or the second lateral slip angle $\beta2$ selected by the selecting means 18 and input to the slip angle calculating means 19, the vehicle speed V detected by the vehicle speed detecting means 10, and the yaw rate $\gamma$ detected by the yaw rate detecting means 8 as well as the steering angle $\delta$ detected by the steering angle detecting means 7. The slip angle $\alpha$ for every wheel determined by the slip angle calculating means 19 is input to the lateral acceleration presuming means 15 for the calculation of the presumed lateral acceleration AYE in the lateral acceleration presuming means 15.

The slip angle $\alpha$ for every wheel determined by the slip angle calculating means 19 is applied to the braking-amount control section 26 for controlling the turning movement of the vehicle based on the wheel slip angle.

An output from the high-select means 24 is input to the friction coefficient presuming means 25, and the high-select means 24 selects a larger one of a value calculated in the first deviation calculating means 20 and a value calculated in the second deviation calculating means 21 to output it.

In the first deviation calculating means 20, a difference (AYE−AY) between the presumed lateral acceleration AYE determined by the lateral acceleration presuming means 15 and the lateral acceleration AY detected by the lateral acceleration detecting means 9 is calculated.

On the other hand, in the second deviation calculating means 21, a difference {(dγ/dt)E−dγ/dt} between the presumed yaw rate variation speed (dγ/dt) E as the vehicle body yaw moment presumed by the vehicle body yaw rate moment presuming means 22 and the yaw rate variation speed dγ/dt determined by the differentiating means 23 for differentiating the yaw rate γ detected by the yaw rate detecting means 8 is calculated.

Figure 7:
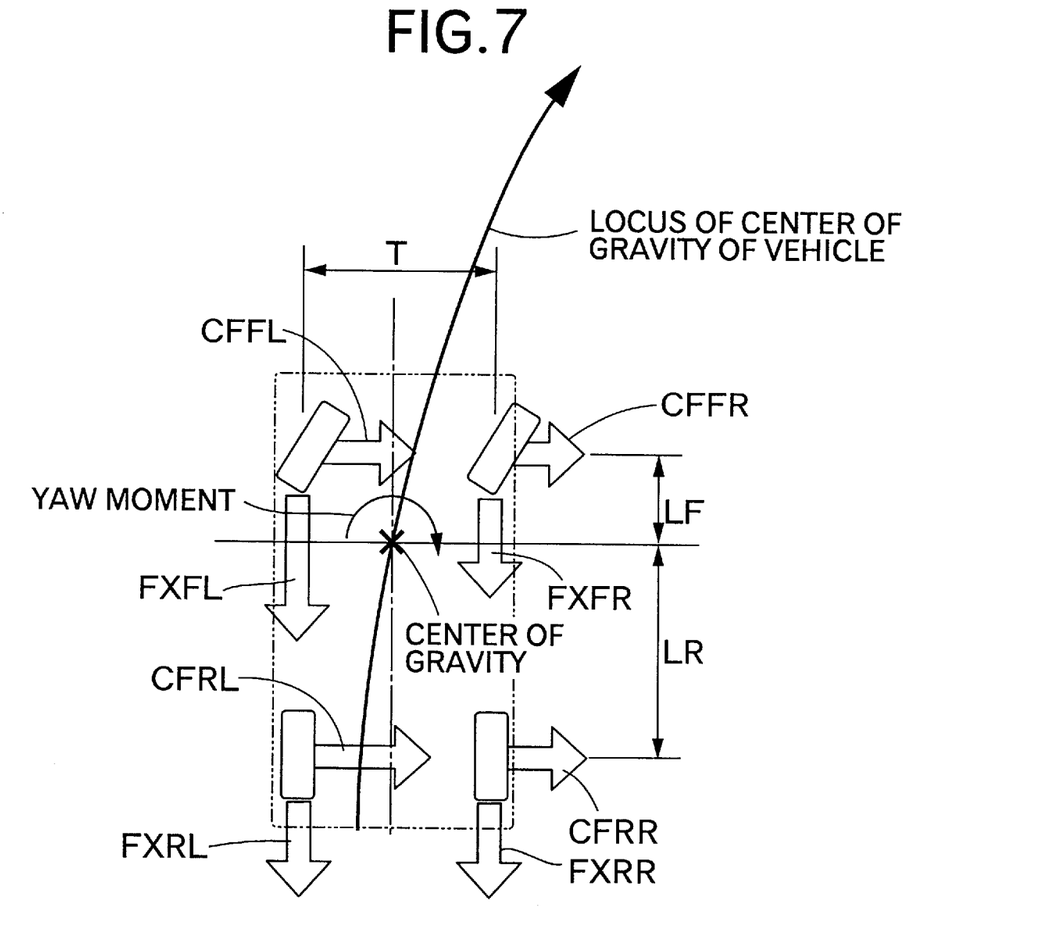
FIG. 7 is a diagram showing a vehicle moment generated by cornering forces and braking/driving forces during turning movement of the vehicle.

If the cornering forces for the left and right front wheels and the left and right rear wheels when the vehicle is being turned, are represented by CFFL, CFFR, CFRL and CFRR; the braking/driving forces for the left and right front wheels and the left and right rear wheels are represented by FXFL, FXFR, FXRL and FXRR; and the tread between the left and right front wheels and between the left and right rear wheels is represented by T in FIG. 7, a presumed yaw rate variation speed (dγ/dt)E as a vehicle body yaw moment is presumed in the vehicle body yaw moment presuming means 22 on the basis of the calculation according to the following equation:

$$(d\gamma/dt)E = (CFFL + CFFR) \times LF + (CFRL + CFRR) \times LR + (FXFL + FXFR + FXRL + FXRR) \times T/2 \quad (11)$$

In the above equation (11), the cornering forces CFFL, CFFR, CFRL and CFRR are provided by carrying out the calculation of (CF×RCF) for each of the left and right front wheels and the left and right rear wheels on the basis of the slip angle/cornering force characteristic and the slip rate/cornering force decrease rate characteristic established in the tire characteristic establishing means 14, and the braking/driving forces FXFL, FXFR, FXRL and FXRR are provided for each of the left and right front wheels and the left and right rear wheels on the basis of the slip rate/braking and driving force characteristic established in the tire characteristic establishing means 14.

To carry out the calculation according to the equation (11), the tire characteristics established in the tire characteristic establishing means 14 are input to the vehicle body yaw moment presuming means 22, and the slip rate λ calculated in the slip rate calculating means 11 is also input to the vehicle body yaw moment presuming means 22.

The lateral acceleration AYE presumed in the lateral acceleration presuming means 15 and the yaw rate variation speed (dγ/dt) E presumed in the vehicle body yaw moment presuming means 22 are based on the tire characteristics established in the tire characteristic establishing means 14. Therefore, when the actual road surface friction coefficient μ is changed from the friction coefficient μ in the tire characteristics used for the calculation of the lateral acceleration AYE and the yaw rate variation speed (dγ/dt)E, a deviation corresponding to the variation in friction coefficient μ must be produced between the lateral acceleration AY detected by the lateral acceleration detecting means 9 and the presumed lateral acceleration AYE and at the same time, a deviation corresponding to the variation in friction coefficient μ must be produced between the differentiation value (dγ/dt) of the yaw rate γ detected by the yaw rate detecting means 8 and the yaw rate variation speed (dγ/dt) presumed in the vehicle body yaw moment presuming means 22. Such two deviations, i.e., the presumed deviation in lateral acceleration and the yaw rate variation rate appear significantly when the road surface friction coefficient is relatively large and when the road surface friction coefficient is relatively small, respectively. Therefore, a larger one of the value calculated by the first deviation calculating means 20 for calculating the deviation between the detected lateral acceleration AY and the presumed lateral acceleration AYE and the value calculated by the second deviation calculating means 21 for calculating the deviation between the differentiation value (dγ/dt) of the detected yaw rate γ and the presumed yaw rate variation speed (dγ/dt)E, i.e., one of these values largely influenced by the variation in friction coefficient μ is determined as being a deviation corresponding to the amount of variation in friction coefficient μ, and is selected in the high-select means 24. A friction coefficient μ is presumed in the friction coefficient presuming means 25 on the basis of the determination that the deviation selected in the high-select means 24 corresponds to a deviation between the values of friction coefficient μ.

More specifically, in the friction coefficient presuming means 25, a friction coefficient μ in the current processing loop is presumed by defining the initial value of the friction coefficient μ as "1", and adding or retracting the friction coefficient variation corresponding to deviation calculated by the first or second deviation calculating means 20 or 21 corresponding to the variation in friction coefficient μ to or from the friction coefficient μ determined in the last processing loop.

The operation of this embodiment will be described below. When it is detected by the travel-state detecting means 13 that the vehicle is in a state traveling straightforwardly at a low speed, a slip angle α for every wheel is calculated based on the second lateral slip angle β2 calculated in the second lateral slip angle calculating means 17. However, the second lateral slip angle β2 is calculated based on the linear two-wheel vehicle's motion model from the detected values of the vehicle speed V, the yaw rate γ, the lateral acceleration AY and the steering angle δ, rather than being calculated by integration. Therefore, even if the detected values of the lateral acceleration V, the yaw rate γ and the vehicle speed V are small due to the low-speed straight traveling state of the vehicle, a sensor noise (mounting error noise) and a travel noise cannot be accumulated, and the lateral slip angle α of each wheel can be calculated with good accuracy, based on the second lateral slip angle β2.

On the other hand, except for the case where the vehicle is in the state traveling straightforwardly at a low speed, the slip angle α of each wheel is calculated based on the first lateral slip angle β1 calculated in the first lateral slip angle calculating means 16. However, among the vehicle speed V, the yaw rate γ and the presumed lateral acceleration AYE used to calculate the first lateral slip angle β, the detected values of the vehicle speed V and the yaw rate γ are relatively large, and the proportion of the noise magnitude to the detected values is relatively small. In addition, the presumed lateral acceleration AYE is presumed using the previously established tire characteristics and at least one of the slip angle calculated in the slip angle calculating means 19 and the slip rate calculated in the slip rate calculating means 11 and hence, the presuming accuracy can be increased. Further, even if the first lateral slip angle β1 is determined by integrating the differentiated value dβ/dt of the lateral slip angle β calculated according to the differential equation based on the non-linear four-wheel vehicle's motion model, the error accumulation due to the noise in the course of integral calculation can be maintained to a small level and hence, the accuracy of calculation of the lateral slip angle β can be increased, and the wheel slip angle α can be determined with good accuracy, based on the lateral slip angle β of the increased accuracy.

Additionally, a deviation between the presumed lateral acceleration AYE determined by the lateral acceleration presuming means 15 and the lateral acceleration AY detected by the lateral acceleration detecting means 9 is calculated in the first deviation calculating means 20. A deviation between the presumed yaw rate variation speed $(d\gamma/dt)E$ as the vehicle body yaw moment determined in the vehicle body yaw moment presuming means 22 and the differentiated value $(d\gamma/dt)$ of the yaw rate $\gamma$ detected by the yaw rate detecting means 8 is calculated in the second deviation calculating means 21. A larger one of the deviations calculated respectively in the deviation calculating means 20 and 21 is alternatively selected in the high-select means 24.

The lateral acceleration presuming means 15 and the vehicle body yaw moment presuming means 22 presume the presumed lateral acceleration AYE and the presumed yaw rate variation speed $(d\gamma/dt)E$, based on the tire characteristics established in the tire characteristic establishing means 14. Therefore, when the actual road surface friction coefficient $\mu$ is changed from the road surface friction coefficient $\mu$ upon the presumption of the lateral acceleration and upon the presumption of the vehicle body yaw moment, deviations corresponding to the variation in the friction coefficient must be calculated in the deviation calculating means 20 and 21. Moreover, the deviations calculated in the deviation calculating means 20 and 21, i.e., the presumed deviation in lateral acceleration and the yaw rate variation rate appear significantly when the road surface friction coefficient is relatively large and when the road surface friction coefficient is relatively small, respectively. Therefore, a larger one of the values calculated in the deviation calculating means 20 and 21, i.e., the deviation largely influenced by the variation in friction coefficient $\mu$ is determined as being a deviation corresponding to the amount of variation in friction coefficient $\mu$, and is selected in the select means 24. A friction coefficient $\mu$ is presumed by the friction coefficient presuming means 25 on the basis of the deviation selected in the select means 24.

Moreover, the tire characteristic establishing means 14 corrects the tire characteristics on the basis of the friction coefficient $\mu$ presumed in the friction coefficient presuming means 25 and hence, a presumed lateral acceleration AYE and a presumed yaw rate variation speed $(d\gamma/dt)E$ corresponding to the actual road surface friction coefficient $\mu$ can be determined. As a result, a wheel slip angle $\alpha$ corresponding to the actual road surface friction coefficient $\mu$ can be determined.

Further, the characteristics showing the relationship between the wheel slip rate varied in accordance with the control of the vehicle's motion using the wheel slip angle $\alpha$ and the braking/driving force as well as the cornering force decrease rate is previously established in the tire characteristic establishing means 14, and the slip rate/braking and driving force characteristic and the slip rate/cornering force decrease rate characteristic are referred to calculate the presumed lateral acceleration AYE and to calculate the presumed yaw rate variation speed $(d\gamma/dt)E$. Therefore, the presumed lateral acceleration AYE and the presumed yaw rate variation speed $(d\gamma/dt)E$ can be determined in consideration of even a variation in slip rate $\lambda$ depending on the control of the motion of each wheel with the calculation of the slip angle $\alpha$ of each of the four wheels, whereby a wheel slip angle further suitable for the actual controlled state can be determined.

Although the embodiment of the present invention has been described in detail, it will be understood that the present invention is not limited to the above-described embodiment, and various modifications may be made without departing from the spirit and scope of the invention defined in claims.

What is claimed is:

1. A wheel slip angle detecting system for a vehicle, comprising a steering angle detecting means for detecting a steering angle; a yaw rate detecting means for detecting a yaw rate; a lateral acceleration detecting means for detecting a lateral acceleration; a vehicle speed detecting means for detecting a vehicle speed; a slip rate calculating means for calculating a slip rate of each of wheels; a tire characteristic establishing means in which tire characteristics are previously determined based on actual travel data; a travel-state detecting means for detecting a travel state of the vehicle based on the vehicle speed, the yaw rate, the lateral acceleration and the steering angle which are detected by said detecting means, respectively; a lateral acceleration presuming means for determining a value in which lateral acceleration of a vehicle body is to be presumed; a first lateral slip angle calculating means for calculating a lateral slip angle of the vehicle body as a first lateral slip angle by integrating a differentiated value of lateral slip angle determined based on a non-linear four-wheel vehicle's motion model using the vehicle speed detected by said vehicle speed detecting means, the yaw rate detected by said yaw rate detecting means and the value in which the lateral acceleration is presumed to be determined by said lateral acceleration presuming means; a second lateral slip angle calculating means for calculating a lateral slip angle of the vehicle body as a second lateral slip angle based on a linear two-wheel vehicle's motion model using the vehicle speed, the yaw rate, the lateral acceleration and the steering angel detected by said detecting means, respectively; a selecting means operable to select the second lateral slip angle calculated in said second lateral slip angle calculating means upon the detection by said travel-state detecting means of a state in which the vehicle is traveling straightforwardly at a low speed, and to select the first lateral slip angle calculated in said first lateral slip angle calculating means in other states; and a slip angle calculating means for calculating a slip angle of each wheel based on the lateral slip angle selected in said selecting means, wherein said lateral acceleration presuming means determines the value in which the lateral acceleration of said vehicle body is presumed based on at least one of the slip angle calculated in said slip angle calculating means and the slip rate calculated in said slip rate calculating means, and based on the tire characteristics established in said tire characteristic establishing means.

2. A wheel slip angle detecting system for a vehicle according to claim 1, further comprising a first deviation calculating means for calculating a deviation between the presumed lateral acceleration determined in said lateral acceleration presuming means and the lateral acceleration detected by said lateral acceleration detecting means based on the tire characteristics established in said tire characteristic establishing means, a vehicle body yaw moment presuming means for presuming a yaw rate variation speed as a vehicle body yaw moment based on the tire characteristics established in said tire characteristic establishing means, a differentiating means for differentiating the yaw rate detected by said yaw rate detecting means, a second deviation calculating means for calculating a deviation between the presumed yaw rate variation speed determined in said vehicle body yaw moment presuming means and a detected yaw rate variation speed determined in said differentiating means, a high-select means for selecting a larger one of the deviations calculated respectively in said first and second deviation calculating means, and a friction coefficient presuming means for presuming a road surface friction coefficient based on said deviation selected in said high-select means, and wherein said tire characteristic establishing means is operable to correct the tire characteristics in accordance with the presumed friction coefficient determined in said friction coefficient presuming means.

* * * * *